Patented Feb. 20, 1934

1,947,650

UNITED STATES PATENT OFFICE 1,947,650

DERIVATIVES OF HIGHER FATTY ACIDS CONTAINING NITROGEN AND PROCESS OF MAKING SAME

Karl Keller, Frankfort-on-the-Main-Fechenheim, Germany, assignor to General Aniline Works, Inc., New York, N. Y., a corporation of Delaware No Drawing. Application January 4, 1930, Serial No. 418,668, and in Germany January 14, 1929

5 Claims. (Cl. 260—124)

My invention relates to new derivatives of higher fatty acids containing nitrogen and a process of making same. They are obtained by treating halogenated fatty acid compounds containing more than 8 carbon atoms and more than 2 halogen atoms in their molecule with solutions of ammonia in organic solvents, especially in an alcohol, with or without the addition of a catalyst. As starting materials halogenated derivatives of higher saturated or unsaturated fatty or hydroxy fatty acids are used obtainable, for instance, according to U. S. application of Karl Keller and Ferdinand Münz, Serial No. 377,348, filed July 10, 1929.

The interaction of ammonia is advantageously carried out at higher temperatures and preferably under elevated pressure. The course of the reaction is not yet known. It varies according to the starting material and the conditions applied. In many cases, so far as free carboxylic acids are used as starting materials, apparently at first carboxyamido groups are formed and in part an esterification may take place owing to the action of the alcohol used. The main reaction consists in the gradual replacement of the halogen atoms by basic groups containing nitrogen, particularly by amino groups. In a given case the halogen atoms are replaced only in part by such basic groups, being in part split off with the formation of a double bond and probably in part remaining unchanged in the molecule of the new compounds.

The products obtained according to my present process are new derivatives of higher fatty acids containing nitrogen, they are soluble in dilute acids, mostly soluble in organic solvents. In the form of their salts formed with acids they are soluble in water. So far as the starting materials used contain free carboxylic acid groups they are transformed into water soluble salts likewise by the action of alkalies. The new products differ substantially in the aforesaid properties from the products obtainable by the action of aqueous solutions of ammonia on the same starting materials, which products are caoutchouc like highly polymerized compounds insoluble in water, dilute acids and alkaline solutions.

The present new products are valuable assistants in the textile industry, since their acid as well as their alkaline solutions have soap-like properties. They may also be used as intermediates for the production of other valuable derivatives of highly fatty acids.

In order to further illustrate my invention the following examples are given, the parts being by weight and all temperatures in centigrade degrees, but it is however to be understood, that my invention is not limited to the particular products nor reacting conditions mentioned therein.

Example 1

25 parts of a hexachlorinated ricinoleic acid (see Example 2 of the aforesaid U. S. application Serial No. 377,348) are heated in an autoclave with a solution of 13 parts of ammonia in about 150 parts of ethyl alcohol for 3-4 hours at 140–150°, the pressure rising to 20 atmospheres during the reaction. After cooling down, the reaction mass consists of an alcoholic solution of the new reaction product, of separated ammonium chloride and a small quantity of resin-like insoluble condensation products. The alcoholic solution is separated from the insoluble ingredients by filtration and the alcohol is distilled off. The reaction product remains as a viscous oil, soluble in water and dilute acids. The analysis shows a content of 4.3% of nitrogen and 22% of chlorine. One double bond can be proved.

By adding a dilute caustic alkali solution to the aqueous solution of this product an oily precipitate is formed consisting perhaps of a mixture of a carboxyamido and an ethylic ester compound or of an inner salt between the carboxylic acid and amino group. By boiling the oil slowly dissolves with saponification and formation of a salt. The product thus formed is soluble in dilute acids as well as in dilute alkali solutions. It may be prepared in a pure state by adding to the weakly alkaline solution a quantity of a mineral acid corresponding to the carboxylic acid group, extracting this solution with an organic diluent and distilling off the solvent.

When heating the same hexachlorinated ricinoleic acid with the same quantity of alcoholic ammonia only for about 1–2 hours at 120–130°, an oil is formed insoluble in dilute acids and caustic alkali solutions. Apparently it represents a mixture of primary formed carboxyamido compound and of a chlorosubstituted unsaturated fatty acid, not containing an amino group, obtained by replacement of chlorine. When boiled with a dilute caustic alkali solution it dissolves with saponification.

When starting from a tetrachlorinatedricinoleic acid, an oil is obtained containing less basic groups containing nitrogen.

Example 2

25 parts of a hexachlorostearic acid (see Example 7 of the aforesaid U. S. application Serial No. 377,348) are heated with a solution of 12 parts of ammonia in about 100 parts of methanol with the addition of 0.2 parts of copper sulfate for about 3 hours in an autoclave at about 140–150° under a pressure of 18–20 atmospheres. After working up the reaction mass as described in the foregoing example, a brownish viscous oil is obtained soluble in water and dilute acids. By dissolving it in water and precipitating with a cold dilute caustic alkali solution it may be purified. It corresponds in its properties with the product of Example 1. By heating with a caustic alkali solution a compound consisting apparently substantially of the free unsaturated aminochlorinated fatty acid is obtained soluble in dilute acids as well as in dilute caustic alkali solutions.

When replacing in this example the methyl alcoholic solution of ammonia by the corresponding quantity of acetone saturated with ammonia, a brownish oil is obtained easily soluble in a warm strongly diluted hydrochloric acid, which may be transformed into the alkali-soluble form being a brownish thinly liquid oil by heating with a dilute caustic alkali solution.

By using a solution of ammonia in butyl alcohol a similar product is obtained containing probably a butylic residue in its molecule.

Example 3

24.5 parts of a chlorinated linoleic acid obtainable by acting with 10.5 parts of chlorine on 14 parts of linoleic acid are heated with a solution of 14 parts of ammonia in about 100 parts of alcohol for about 3 hours at about 140–150° under a pressure of about 20 atmospheres. The reaction mass is worked up as described in Example 1. The new product being a light brown oil soluble in water and dilute acids apparently consists substantially of an unsaturated aminocholoro fatty acid, containing two amino groups, two chlorine atoms and one double bond. From the aqueous solution the product is salted out by adding a caustic alkali solution and it is redissolved by adding water.

Example 4

53 parts of a tetrachlorinated derivative of oleic acid ethylanilide are heated in an autoclave with a solution of 30 parts of ammonia in about 300 parts of ethyl alcohol for several hours at about 150°. The reaction product is a viscous oil of an unsaturated character containing more nitrogen than the starting material.

I claim:—

1. A process which comprises acting with a solution of ammonia in an organic solvent in a closed vessel at temperatures from about 120° to 150° C. on a halogenated fatty acid compound containing more than 8 carbon atoms and more than 2 halogen atoms of the general formula

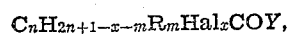

$C_nH_{2n+1-x-m}R_mHal_xCOY$, wherein R means hydrogen or hydroxyl, Y hydroxyl or the radical

in which R is hydrogen or a monovalent hydrocarbon radical, $m$ the number 1 or 2 and $x$ a number more than 2.

2. As new compounds derivatives of higher fatty acids, containing more than 8 carbon atoms and containing nitrogen, being soluble in dilute acids, in form of their salts formed with acids being soluble in water, being mostly viscous oils and mostly soluble in organic solvents and convertible into water-soluble salts by the action of alkalies, which products are obtainable by acting with a solution of ammonia in an organic solvent on a halogenated fatty acid compound containing more than 8 carbon atoms and more than 2 halogen atoms of the general formula

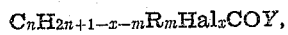

$C_nH_{2n+1-x-m}R_mHal_xCOY$, wherein R means hydrogen or hydroxyl, Y hydroxyl or the radical.

in which R is hydrogen or a monovalent hydrocarbon radical, $m$ the number 1 or 2 and $x$ a number more than 2.

3. As new compounds derivatives of higher fatty acids, containing 18 carbon atoms and containing nitrogen, being soluble in dilute acids, in form of their salts formed with acids being soluble in water, being mostly viscous oils and mostly soluble in organic solvents and convertible into water soluble salts by the action of alkalies, which products are obtainable by acting with a solution of ammonia in an organic solvent on a halogenated fatty acid compound containing 18 carbon atoms and more than 2 halogen atoms of the general formula $C_{17}H_{35-x-m}R_mHal_xCOY$, wherein R means hydrogen or hydroxyl, Y hydroxyl or the radical

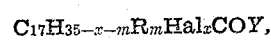

in which R is hydrogen or a monovalent hydrocarbon radical, $m$ the number 1 or 2 and $x$ a number more than 2.

4. As a new compound a derivative of ricinoleic acid containing nitrogen and chlorine and a double bond in its molecule, being a viscous oil, soluble in dilute acids, soluble in water as hydrochloric salt, soluble in organic solvents and convertible into water-soluble salts by the action of alkalies, which product is obtainable by acting with a solution of ammonia in an organic solvent on a hexachlorinated ricinoleic acid of the formula $C_{17}H_{28}(OH)Cl_6COOH$.

5. A process which comprises acting with a solution of ammonia in an organic solvent on a halogenated fatty acid compound containing more than 8 carbon atoms and more than 2 halogen atoms of the general formula

$C_nH_{2n+1-x-m}R_mHal_xCOY$ wherein R means hydrogen or hydroxyl, Y hydroxyl or the radical of an organic amino compound of the benzene series, $m$ the number 1 or 2, and $x$ a number more than 2.

KARL KELLER.